UNITED STATES PATENT OFFICE.

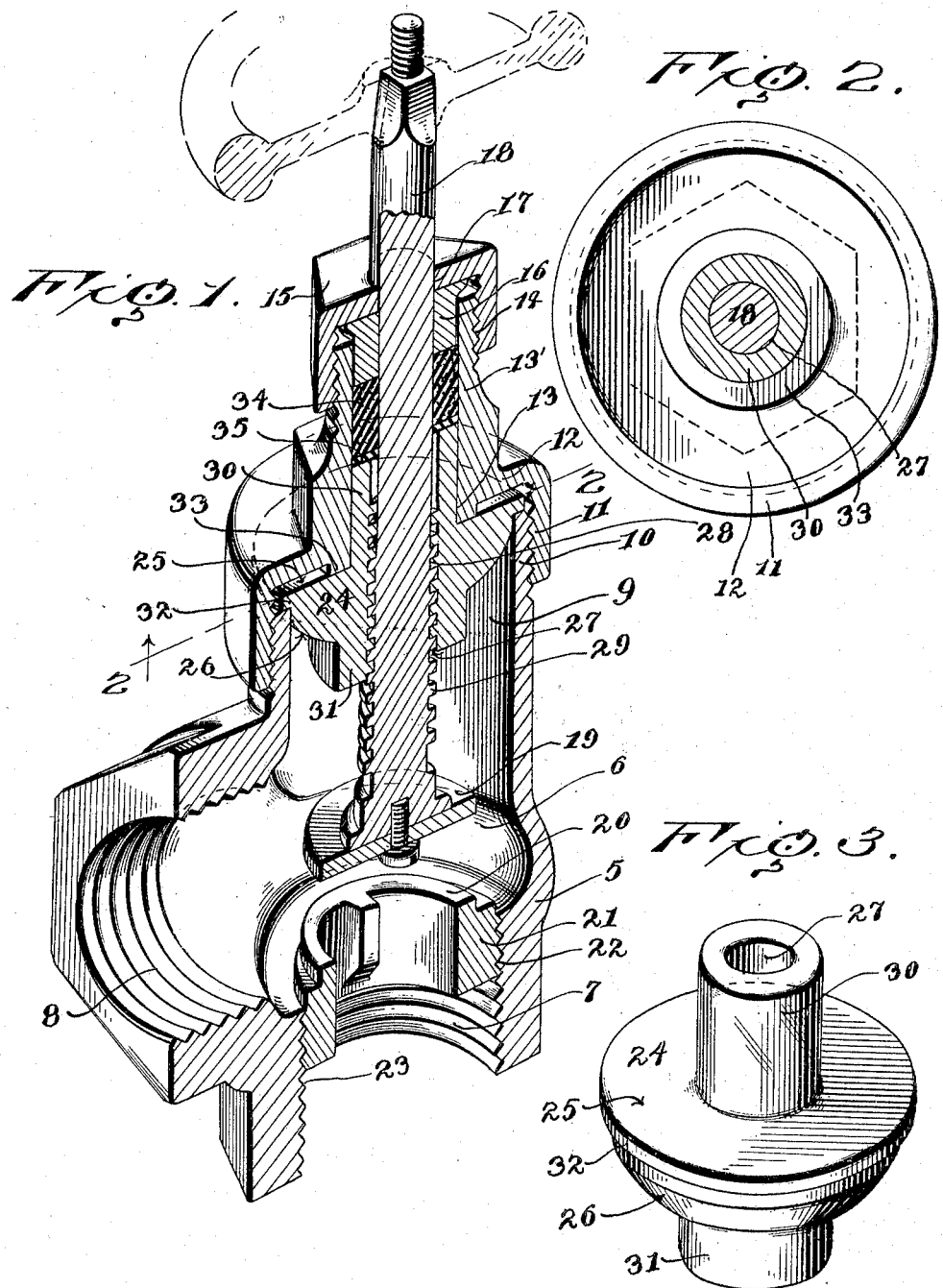

HENRY B. HAVILAND, OF FERRY ROAD, NEW BRUNSWICK, CANADA.

ACID-VALVE STRUCTURE.

1,325,846.  Specification of Letters Patent.  Patented Dec. 23, 1919.

Application filed January 14, 1919. Serial No. 271,057.

*To all whom it may concern:*

Be it known that I, HENRY B. HAVILAND, a subject of the King of England, residing at Ferry Road, in the Province of New Brunswick, Dominion of Canada, have invented certain new and useful Improvements in Acid-Valve Structures; and I do hereby declare the following to be a full, clear, and exact description of the invention, such as will enable others skilled in the art to which it appertains to make and use the same.

This invention relates to valves and more particularly to valves designed for use in acid lines, and has for its object to provide a valve in which a removable member is interposed between the bonnet and the acid passage, so that this member will itself be subjected to the action of the acid and thus protect the bonnet.

Another object is to provide a structure as just set forth, in which the removable member will be so constructed as to form a tight union with the valve body so as to prevent leakage of acid therearound and into contact with the bonnet, and in which, also, the removable member will include threads for coöperation with a threaded valve stem for movement of the valve proper into and out of closed position.

Another object is to provide a structure in which the removable member is so made and is so associated with the bonnet that the packing of the valve engages directly against the removable member, thus tending further to prevent leakage of acid to any part of the bonnet.

In the drawings:

Figure 1 is a sectional perspective view of the complete structure;

Fig. 2 is a section through the removable member on line 2—2 of Fig. 1, looking upwardly as indicated by the arrow, the bonnet being shown in elevation.

Fig. 3 is a perspective view of the removable member.

Referring now to the drawings, there is shown a valve including the usual body 5 having an interior chamber 6, with which there communicate inlet and outlet passages 7 and 8 respectively which are arranged at right angles to each other as shown. The body is open at a point directly opposite the inlet passage 7, as shown at 9, and this opening is surrounded by an exteriorly threaded circular flange 10, which receives the internally threaded flange 11 of a bonnet 12.

The bonnet 12 has a central opening 13 formed therein, and formed integrally with the bonnet and constituting a part thereof, there is an outwardly extending sleeve which surrounds this opening, the sleeve being indicated at 13'. The outer portion of this sleeve is threaded as indicated at 14, for the reception of the cap nut 15 of a packing gland, the follower 16 of which is engaged within the outer end of the sleeve. The cap nut 15 has a central opening 17, which receives a valve stem 18, the latter extending through the follower 16 and into the body 5, this stem carrying a valve proper 19 at its inner end which may be brought into and out of engagement with a seat 20 surrounding the inlet passage 7, through longitudinal movement of the stem 18.

The seat 20 is included in a separate annular member 21, having external threads 22, which are engaged with threads 23 formed upon the inner wall of the passage 7, as shown.

The essential feature of the present invention resides in the member indicated in the drawings at 24. This member is annular in form and has a flat outer surface 25 and a convex inner surface 26. Its central passage 27 is interiorly threaded as shown at 28 for the reception of threads 29 formed upon the valve stem 18, and formed upon the member and extending beyond its faces 25 and 26, there are oppositely extending sleeves 30 and 31, respectively, which surround the opening 27, the passages through these sleeves forming continuations of this opening 27. The threads 28 are continued through the sleeve 31, and are also carried partially through the sleeve 30, terminating short of the outer end thereof. The member 24 is also provided with a circumscribing flange 32, so positioned that when the member is disposed with this flange resting upon the flange 10 of the body, the convex portion of the member and the sleeve 31 will extend into the chamber 6, within the inclosure of the flange 10.

The opening 13 of the bonnet and the passage through the sleeve 13' are of a size to receive the sleeve 30 therewithin, as shown, snugly, and thus, when the parts are assembled, as shown in Fig. 1, the member 24 lies in position to receive the valve stem 18 therethrough.

The bonnet 12 has an inwardly extending flange 33 surrounding its opening 13, and this flange bears against the outer surface 25 of the member 24, so that when the bonnet is screwed in place upon the flange 10, the member is forced against the edge of this flange and a tight union is effected, the two flanges 10 and 32 being ground to an acid tight fit.

The sleeve 30 terminates short of the upper end of the sleeve 13′ and lies spaced from the follower 16, so that a quantity of packing material 34 may be disposed between the two, to prevent leakage around the valve stem 18. If desired, a stiff fiber washer 35 may be disposed between the outer end of the sleeve 30 and the packing material, to prevent this material from being forced into the passage 27 around the valve stem.

From the foregoing it will be seen that in the present structure, the member 24 is interposed between all portions of the bonnet 12 and the chamber 6; and that access of acid to the bonnet and consequent injury thereto, is prevented. The member 24 and not the bonnet, receives the disintegrating action of the acid, and when the member has been so affected as to impair its use, it may be readily removed by simply unscrewing the bonnet 12 and disengaging the member from the valve stem.

What is claimed is:

A valve structure including a body having a chamber therewithin and having an opening communicating with the chamber and surrounded by a flange, a member having a flange extending over and engaging the first flange, said member extending within the inclosure of the first flange, a bonnet threaded upon the first flange and having a passage therethrough and having also a flange surrounding the passage and engaging the member for pressing against the member to hold the latter with its flange against the first flange when the bonnet is screwed home upon said first flange, said member having a sleeve fitting snugly within the passage of the bonnet, a packing follower within the passage of the bonnet and spaced from the sleeve, packing material between the follower and sleeve, a cap nut threaded upon the bonnet and engaging the follower and a valve stem threaded through the member and its sleeve and lying within the passage of the bonnet.

In testimony whereof, I affix my signature, in the presence of two witnesses.

HENRY B. HAVILAND.

Witnesses:
 ROBT. MURRAY,
 ETHEL STOTHART.